Oct. 1, 1935.    B. CARCANO    2,015,786
HOSE CONNECTION
Filed April 4, 1934
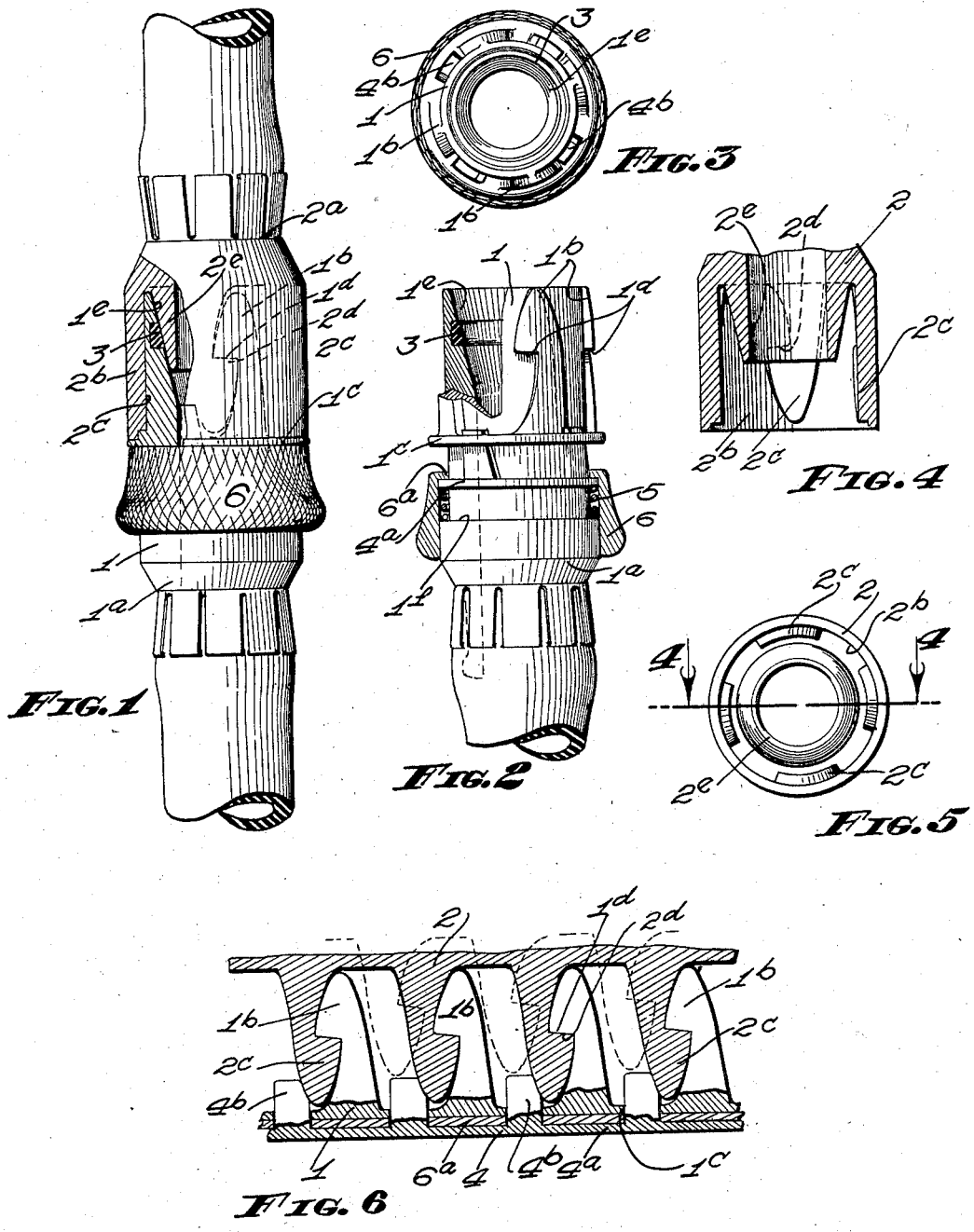
Inventor
BATTISTA CARCANO
By A. B. Bowman
Attorney Patented Oct. 1, 1935

2,015,786

UNITED STATES PATENT OFFICE 2,015,786

HOSE CONNECTION

Battista Carcano, San Diego, Calif.

Application April 4, 1934, Serial No. 718,933

3 Claims. (Cl. 285—178)

My invention relates to hose connections, and the objects of my invention are:

First, to provide a hose coupling which is particularly easy to connect and disconnect yet will not accidentally come apart;

Second, to provide a hose coupling which may be connected or disconnected with one hand as when connecting a hose to a faucet or hydrant;

Third, to provide a hose connection which incorporates tapered interlocking catch elements and a locking means for holding the catch elements in engagement, the catch elements tending to guide each other into interlocking relation when the two parts of the coupling are brought together, thus providing a hose coupling which is particularly adapted for use in out of the way places or in the dark or wherever one utilizes his sense of touch, and Fourth, to provide on the whole a novelly constructed hose coupling which is durable, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is an elevational view of my hose coupling shown in its connected position with parts and portions broken away and in section to facilitate the illustration; Fig. 2 is a partial elevational partial sectional view of one of the coupling units with the locking mechanism retracted; Fig. 3 is an end elevational view thereof; Fig. 4 is a transverse sectional view of the other coupling unit shown fragmentarily and taken through 4—4 of Fig. 5; Fig. 5 is an end elevational view thereof, and Fig. 6 is a developed view showing particularly the catch elements in their interlocking relation and being held by the locking mechanism.

Similar characters of reference refer to similar parts and portions throughout the several views of the drawing.

Coupling members 1 and 2, gasket 3, locking element 4, spring 5, and collar 6, constitute the principal parts and portions of my novel hose connection.

The coupling member 1 is tubular in form the outer surface of which is generally constant in diameter. The coupling is provided with a base end $1a$ having suitable means for connection to a hose or the like. The extended end is provided with a plurality of catch elements $1b$ which are disposed axially with their base ends joining an annular rib $1c$ disposed inwardly from the extremity of the coupling member. Each catch element $1b$ is formed in base relief on the coupling member and its edges taper generally toward the extremity thereof, except for a shoulder $1d$ intermediate its ends and which is disposed circumferentially. The extremities of the catch elements have rounded points and by reason of their generally tapering form define between adjacent catch elements a series of axially inwardly tapering areas of lesser diameter.

The coupling member 2 includes a base end $2a$ having suitable means for connection to a hose, faucet or the like, and a cup-shaped extended portion $2b$. The normal diameter within the cup portion $2b$ is such that it fits over the several catch elements $1b$. On the inner surface in base relief as are the catch elements $1b$, is a plurality of catch elements $2c$. The catch elements $2c$ are similar in form to the catch elements $1b$, that is, the edges of said elements taper towards the extremity of the socket portion $2b$ and are provided with shoulders $2d$. The several catch elements $2c$ fit into the generally V-shaped spaces formed between the catch elements $1b$ and upon being inserted until the extremity of the coupling member 2 is adjacent the rib $1c$ the two coupling members may be turned relative to each other so that the shoulders $1d$ and $2d$ interlock, as shown in Fig. 6. It will be noted that the generally tapering form and rounded ends of the catch elements $1b$ and $2c$ automatically guide these elements into axially overlapping relation with each other so that their respective shoulders readily engage.

The bore of the coupling member 1 diverges towards its extremity, indicated by $1e$, and is provided in its periphery near its extremity with an annular channel in which is mounted a gasket 3. The socket of the coupling member 2 is provided with a centered boss $2e$ having tapering radially outer walls which conform to the tapering end $1e$ of the coupling member 1, as shown best in Fig. 1.

The locking element 4 comprises a ring portion $4a$ slidably mounted around the coupling member 1 between the rib $1c$ and the base $1a$, and a plurality of radially directed fingers $4b$ which extend through slots formed in the rib $1c$ so as to project into the spaces between the several catch elements $1b$. The extremities of the fingers $4b$ are flat and extend circumferentially so as to be engaged by the extremities of the several catch elements 2c as the coupling members are moved into engaging relation whereby the locking element is depressed to the position shown in Fig. 2 until the coupling members are turned to bring the shoulders 1d and 2d into engagement, whereupon the locking element is free to move axially outwardly so that the several fingers 4b enter between the non-engaging sides of the catch elements, as shown in Fig. 6, and thereby hold the coupling members in connected relation.

The locking element 4 is backed by a spring 5 which bears against the ring 4a and a shoulder 1f provided near the base end of the coupling member 1. An operating collar 6 is positioned around the ring 4a and over the spring 5. Said collar is provided with inturned portions 6a which engage the axially outer side of the ring 4a so that the ring may be moved axially inwardly against the action of the spring 5.

In joining the coupling members it is merely necessary to force the two together against the action of the spring 5 then give a slight turn. To un-couple it is merely necessary to pull upon the collar 6 at the same time giving a slight twist. It should be noted that the edges of the fingers 4b engaging the catch elements 2c are beveled slightly to conform to the slope of said catch elements, as shown in Fig. 6.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A hose coupling comprising, a pair of coupling members, a coacting tongue and socket means incorporated in said coupling members, a plurality of duplicate shaped tapering interlocking elements carried by said tongue and socket means, including axially interlocking shoulders, the tapering interlocking elements on each coupling member defining guides for the elements on the other coupling member whereby said coupling members are guided into position for coaction of their respective interlocking shoulders, and a second tongue and socket means incorporated in said coupling members, the second means being tapered, and a gasket interposed between the coacting portions of said means.

2. A hose coupling comprising, a pair of coupling members, a coacting tongue and socket means incorporated in said coupling members, a plurality of duplicate shaped tapering interlocking elements carried by said tongue and socket means, including axially interlocking shoulders, the tapering interlocking elements on each coupling member defining guides for the elements on the other coupling member whereby said coupling members are guided into position for coaction of their respective interlocking shoulders, a device carried by one of the coupling members engageable with the interlocking elements of the other coupling member to secure said elements in interlocking relation, and a second tongue and socket means incorporated in said coupling members, the second means being tapered, and a gasket interposed between the coacting portions of said means.

3. A hose coupling comprising, a pair of coupling members, a coacting tongue and socket means incorporated in said coupling members, a plurality of tapering interlocking elements carried by said tongue and socket means, including axially interlocking shoulders, the tapering interlocking elements on each coupling member defining guides for the elements on the other coupling member whereby said coupling members are guided into position for coaction of their respective interlocking shoulders, a device carried by one of the coupling members engageable with the interlocking elements of the other coupling member to secure said elements in interlocking relation, said device including fingers entering between several of the interlocking elements, yieldable means tending to retain the fingers in such position, a handle for simultaneously withdrawing said fingers, and a second tongue and socket means incorporated in said coupling members, the second means being tapered, and a gasket interposed between the coacting portions of said means.

BATTISTA CARCANO.